United States Patent
Gulla et al.

(10) Patent No.: US 9,315,912 B2
(45) Date of Patent: Apr. 19, 2016

(54) CARBON-SUPPORTED METAL SULPHIDE CATALYST FOR ELECTROCHEMICAL OXYGEN REDUCTION

(75) Inventors: Andrea F. Gulla, Malden, MA (US); Robert J. Allen, South Harwich, MA (US)

(73) Assignee: INDUSTRIE DE NORA S.P.A., Milan (IT)

( * ) Notice: Subject to any disclaimer, the term of this patent is extended or adjusted under 35 U.S.C. 154(b) by 2661 days.

(21) Appl. No.: 11/982,799

(22) Filed: Nov. 5, 2007

(65) Prior Publication Data

US 2008/0121520 A1  May 29, 2008

Related U.S. Application Data

(60) Provisional application No. 60/861,635, filed on Nov. 29, 2006.

(51) Int. Cl.
| | |
|---|---|
| *C25B 11/04* | (2006.01) |
| *B01J 27/045* | (2006.01) |
| *H01M 4/90* | (2006.01) |
| *H01M 4/92* | (2006.01) |
| *B01J 21/18* | (2006.01) |

(52) U.S. Cl.
CPC ........... *C25B 11/0447* (2013.01); *B01J 27/045* (2013.01); *H01M 4/90* (2013.01); *H01M 4/9083* (2013.01); *H01M 4/923* (2013.01); *H01M 4/926* (2013.01); *B01J 21/18* (2013.01); *Y02E 60/50* (2013.01)

(58) Field of Classification Search
USPC .................................................. 502/216, 223
See application file for complete search history.

(56) References Cited

U.S. PATENT DOCUMENTS

| | | | | |
|---|---|---|---|---|
| 5,879,828 | A | * | 3/1999 | Debe et al. ................... 429/483 |
| 6,149,782 | A | | 11/2000 | Allen |
| 6,402,930 | B1 | | 6/2002 | Allen |
| 6,967,185 | B2 | | 11/2005 | Allen |

FOREIGN PATENT DOCUMENTS

WO    WO 2004/106591 A1    12/2004

* cited by examiner

*Primary Examiner* — Nicholas A Smith
(74) *Attorney, Agent, or Firm* — Lucas & Mercanti, LLP.

(57) ABSTRACT

An improved carbon supported-noble metal sulphide electrocatalyst suitable for being incorporated in gas-diffusion electrode structures, in particular in oxygen-reducing gas-diffusion cathodes for aqueous hydrochloric acid electrolysis. The noble metal sulphide particles are monodispersed on the active carbon particles and the surface area ratio of noble metal sulphide particles to active carbon particles is at least 0.20.

11 Claims, 5 Drawing Sheets

CARBON-SUPPORTED METAL SULPHIDE CATALYST FOR ELECTROCHEMICAL OXYGEN REDUCTION

PRIOR APPLICATION

This application claims the benefit of U.S. Provisional Application Ser. No. 60/861,635 filed Nov. 29, 2006.

ABSTRACT

The invention relates to an improved carbon supported-noble metal sulphide electrocatalyst suitable for being incorporated in gas-diffusion electrode structures, in particular in oxygen-reducing gas-diffusion cathodes for aqueous hydrochloric acid electrolysis. The noble metal sulphide particles are monodispersed on the active carbon particles and the surface area ratio of noble metal sulphide particles to active carbon particles is at least 0.20.

1. Field of the Invention

The invention relates to an electrocatalyst, in particular to a carbon supported-noble metal sulphide catalyst suitable for electrochemical oxygen reduction, for instance in aqueous hydrochloric acid electrolysis.

2. State of the Art

The sulphides of noble metals, especially rhodium and ruthenium sulphides, are known for their activity towards the electrochemical oxygen reduction reaction (ORR) and their stability in chemically aggressive environments. These two features make them particularly useful in the formulation of cathodes, especially gas-diffusion cathodes, for depolarised hydrochloric acid electrolysis applications, as disclosed in U.S. Pat. No. 6,149,782, U.S. Pat. No. 6,402,930 or WO 2004/106591.

Another useful feature of noble metal sulphide electrocatalysts is their high tolerance to poisoning species, in particular to organic molecules, which makes them useful is some fuel cell applications such as direct alcohol fuel cells.

Rhodium sulphide is nowadays the preferred choice for commercial applications in view of its higher resistance to chlorinated hydrochloric environments, although the very high cost of Rh implies a heavy burden on the overall economics of the process; commercial gas-diffusion electrodes are usually activated with about 10 $g/m^2$ of Rh expressed as metal in order to obtain a sufficient electrochemical activity, also because some of the Rh is invariably leached at an early stage of functioning. The latter phenomenon is most likely due to the formation of by-product metallic rhodium during the sulphidation reaction. Binary and ternary ruthenium sulphides (for example Ru—Co sulphide) would be an interesting cheaper alternative in view of their high activity towards ORR, nevertheless, their use is not yet commercial at least for two reasons: firstly, their stability in HCl electrolysis environment is lower than that of Rh sulphides and secondly, they are only obtained through direct sulphidation with $H_2S$, which is clearly a hazardous and environment-unfriendly process. Rh sulphides conversely can be efficiently obtained via a wet chemistry method in a sulphide-free environment according to the disclosure of U.S. Pat. No. 6,967,185. This same process does not give very good results with ruthenium, since the corresponding Ru sulphide precipitates in a mixed valence state with formation of mixed phases of $Ru_xS_y$ and $Ru_xO_y$, which have different degrees of activity and stability in the actual cell environment.

OBJECTS OF THE INVENTION

It is one object of the present invention to provide carbon-supported noble metal sulphide catalysts of increased activity towards oxygen electrochemical reduction, and a method for their manufacturing.

Under another aspect, it is one object of the present invention to provide carbon supported-noble metal sulphide catalysts of increased stability in chemically aggressive environments, such as hydrochloric acid with optional presence of free chlorine, and a method for their manufacturing.

Under another aspect, it is one object of the present invention to provide gas-diffusion electrode structures incorporating novel carbon-supported noble metal sulphide catalysts.

DESCRIPTION OF THE INVENTION

Under one aspect, the invention consists of a noble metal sulphide catalyst supported on active carbon particles characterised by a strict control of particle size and surface area parameters, so that the ratio of the superficial area of the noble metal sulphide particles to the superficial area of the selected active carbon is at least 0.20, and preferably higher than 0.25. The inventors have surprisingly observed that when noble sulphide catalysts are manufactured by means of a process allowing to control their particle size and to suitable disperse them on the carbon support, so that a single-mode distribution (or monodispersion) thereof is obtained, a higher catalyst surface is exposed to the reactants for a given loading and the catalyst utilisation factor is dramatically increased. As a consequence, while for the metal sulphides of the prior art the overall activity generally increases with the total noble metal loading until reaching an asymptotic value, the monodispersed catalyst of the invention presents a characteristic optimum noble metal loading which is a function of the surface area of the chosen carbon support: when the noble metal loading exceeds a certain value, the monodispersed distribution of the noble metal sulphide particles is lost, and their total surface area sharply decreases. The optimum noble metal sulphide loading is therefore dependant on the characteristics of the active carbon support, and in general a higher loading is required for carbon particles of higher surface area to attain the optimum value.

The sulphides of the noble metals are all characterised by the same cuboctahedral geometry, which implies that when a suitable monodispersion is reached on the carbon the art. In one preferred embodiment, the noble metal loading on the gas-diffusion electrode of the invention is comprised between 3 and 5 $g/m^2$.

Under yet another aspect, the invention consists of a method for producing a monodispersed noble metal sulphide catalyst on an active carbon support controlling the particle size and surface area parameters, so that the surface area ratio of noble metal sulphide particles to active carbon particles is at least 0.20, and preferably at least 0.25. The present invention will be described hereafter making reference to the following figures which shall not be intended as a limitation of the same.

DETAILED DESCRIPTION OF THE FIGURES

Figure 1:
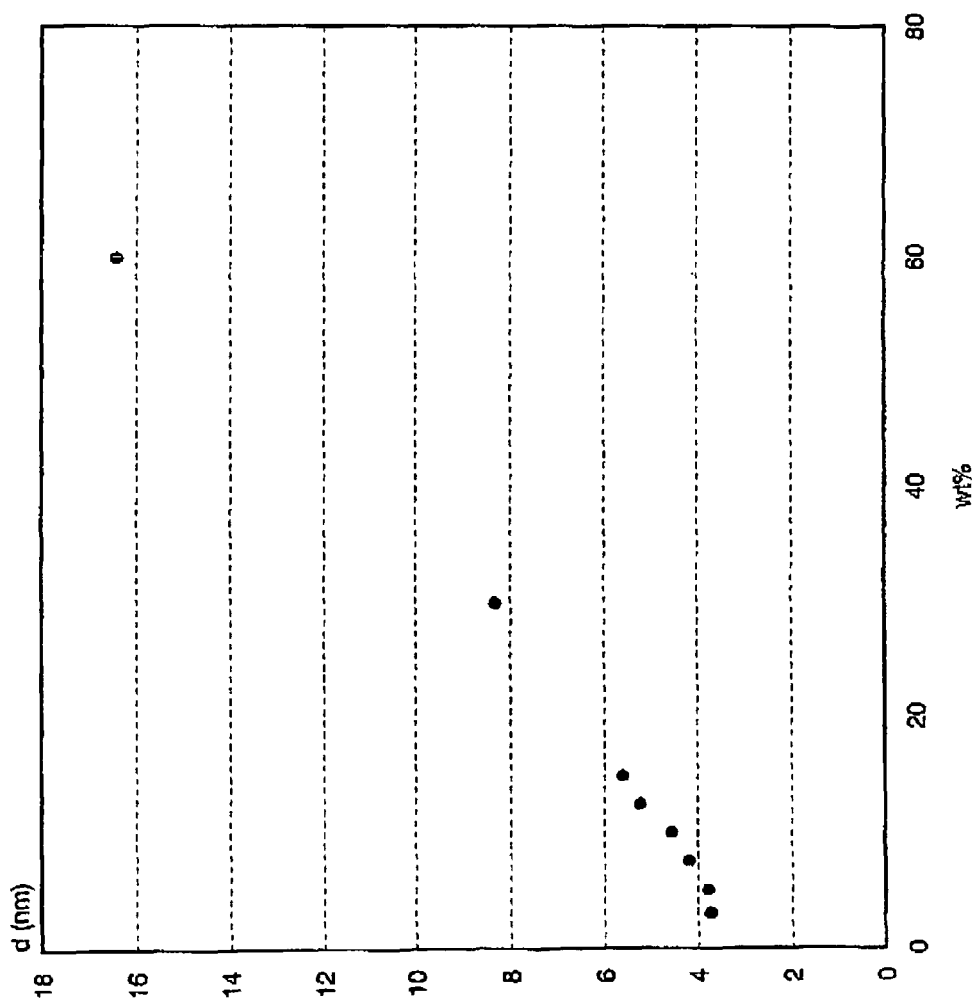
FIG. 1 shows the average particle size of a rhodium sulphide catalyst supported on Vulcan XC-72 carbon at different specific loadings

FIG. 1 reports the average particle size of carbon supported-rhodium sulphide catalysts obtained by precipitation from $RhCl_3$ and a suitable thionic species in accordance with the method of U.S. Pat. No. 6,967,185, which is incorporated herein in its entirety. In the present case, $(NH_4)_2S_2O_3$ was used as the thionic reactant and Vulcan XC-72 as the carbon support, characterised by a surface area of 250 m$^2$/g. The catalysts obtained are indicated particles, the obtained surface area ratio of noble metal sulphide particles to active carbon particles is more or less the same for the whole series of noble metals. Independently from the noble metal of choice, the catalyst of the invention is characterised by a surface area ratio of noble metal sulphide particles to active carbon particles of at least 0.20, most preferably of 0.25 or slightly more, which is an intrinsic limiting value.

According to one preferred embodiment of the invention, the noble metal of choice is rhodium, which can be easily precipitated in a monodispersed distribution on active carbon supports by reacting a suitable noble precursor with a thionic species, as disclosed in U.S. Pat. No. 6,967,185, when the reaction conditions are appropriately selected. When incorporated in a gas-diffusion electrode, the rhodium sulphide catalysts of the invention show a higher activity towards ORR at much lower noble metal loadings (as low as 0.5 to 3 g/m$^2$) with respect to rhodium sulphide catalysts of the prior art, thereby allowing a substantial cost reduction.

In one preferred embodiment, the active carbon of choice as a catalyst support is Vulcan XC-72 commercialised by Cabot Corp., due to the narrow dispersion of the surface area thereof around the value of 250 m$^2$/g, typically in an interval between 200 and 300 m$^2$/g. Rhodium sulphide dispersed on such carbon attains the required sulphide to carbon surface area ratio for specific loadings of 12 to 18% Rh metal w/o, but one skilled in the art can easily infer the optimum value for other carbons of known surface area.

The following examples are relative to monodispersed rhodium metal sulphides given the industrial relevance of the hydrochloric acid electrolysis process in which they are used, but it will be evident to one skilled in the art that the same teaching can be applied to other noble metal sulphide electrocatalysts for use on other fields, e.g. direct alcohol fuel cells.

Under another aspect, the invention consists of a gas-diffusion electrode incorporating novel carbon supported-noble metal sulphide catalysts, for instance a gas-diffusion cathode for hydrochloric acid electrolysis. The gas-diffusion electrode of the invention is obtained on an electrically conductive web, for instance a woven or non woven carbon cloth or carbon paper or other suitable porous carrier, optionally provided with gas diffusion layers for instance consisting of carbon-hydrophobic binder mixtures as known in by the general formula $Rh_xS_y$, since they consist of several phases, among which $Rh_{17}S_{15}$ and $Rh_3S_4$ are prevalent. As reported in the figure, the average diameter of the catalyst particles increases with the total loading of $Rh_xS_y$ as expected; from the SEM micrographs it emerges a vastly changed catalyst $(Rh_xS_y)$ distribution tightly related to the degree of dispersion of each of the catalysts prepared i.e., intrinsic distribution of the catalytic clusters which goes from a large bi-modal type cluster distribution (30 wt. % loading) to a very fine single mode distribution at low loadings (15 wt. % loading). Furthermore, in the 15 wt. % loading case, the very good distribution on the Vulcan flakes not only allows for a effective saving of 50% in the amount of catalyst used but more importantly allows for ca. twice as much value for the areal number density of particles for the latter. The typical particle size of the round sulphide crystallites is, for the most part, measured to be between the 8.3±3.7 nm and 5.6±2.1 nm, for the 30 wt. % and 15 wt. % samples, respectively.

According to the above data, the ultimate (physical) surface area that the $Rh_xS_y$ crystallites expose are very similar for both electrocatalysts, consequently, Rh dispersion is much higher in the 15 wt. % sample compared to the 30 wt. % material. This behaviour is very important from the perspective of both activity and catalyst mass exposition on the support. The sulphide monodispersion for low-loaded catalysts is obtainable by suitably selecting the manufacturing conditions: the method for preparing the catalyst of the invention provides preparing a solution of a soluble noble metal precursor, in the present case $RhCl_3$, dispersing a predetermined amount of active carbon powder in order to obtain the required loading, adding a solution of a thionic reactant, in the present case $(NH_4)_2S_2O_3$, in a step-wise manner and optionally heating the solution to reduce the time of precipitation. The filtered and dried product can be heat-treated as known in the art until achieving the required degree of crystallinity for the target application, for instance at a temperature of 150 to 700° C.

In addition to the more beneficial morphological characteristics, (surface) crystallography/chemistry also contribute to a higher noble metal utilisation in the 15 wt. % $Rh_xS_y$ electrocatalysts in comparison to the 30 wt. % system. The electrochemical charges associated with surface oxidation/reduction are almost twice as high for the 15 wt. % sample than for the standard 30 wt. % sample.

Figure 2:
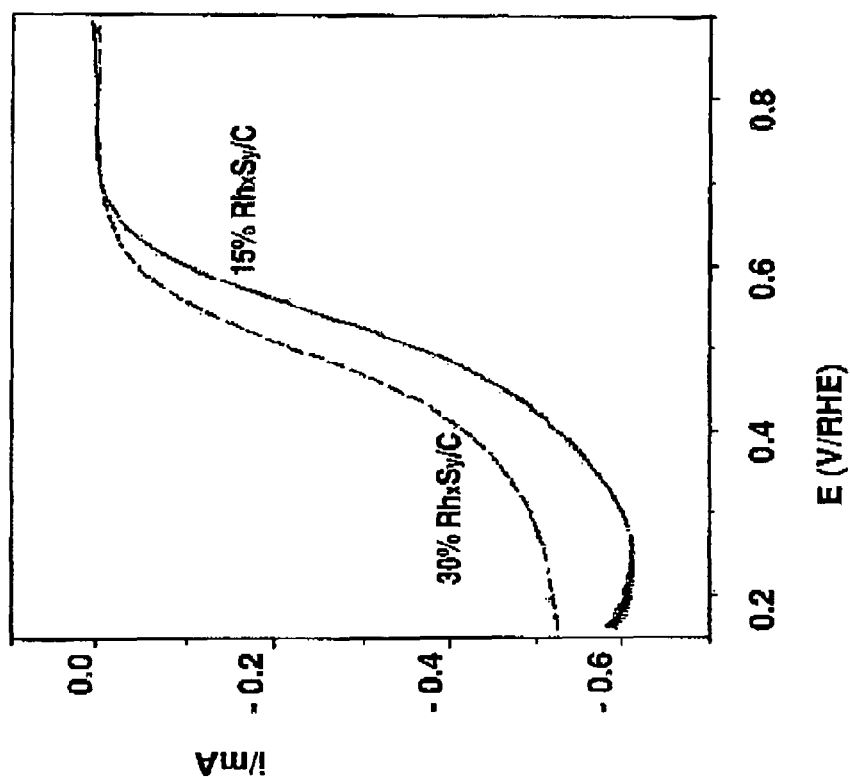
FIG. 2 shows the RDE activity towards ORR of rhodium sulphide catalysts supported on carbon at different specific loadings in $O_2$-saturated 1 M HCl electrolyte

FIG. 2 shows the RDE activity towards ORR of two carbon-supported rhodium sulphide catalysts. To obtain these plots, an isopropanol-based catalyst suspension was sonicated and an aliquot volume (18 μL) thereof was dispersed on the surface of the glassy carbon disk via a micro-syringe and in three regularly timed steps. The suspensions were prepared so as to obtain a 50 μg $Rh_xS_y$/C loading on the 0.5 cm$^2$ disk surface (0.2 mg/cm$^2$ specific loading) for both the 15 wt. % and 30 wt. % catalyst systems. After letting the suspension drop dry onto the disk under moderate temperature under a heat lamp, a thin capping layer was formed by applying 116 μL of a 200-time diluted 5 wt % Nafion solution. The RDE experiments were carried out in a regular three-electrode electrochemical cell containing the oxygen-saturated 1M hydrochloric acid solution. A Pt wire and an Ag/AgCl (3M NaCl) electrode were used as counter and reference electrodes, respectively. All electrode potentials reported herein are however referenced vs. RHE (0.24 V vs. Ag/AgCl (3M NaCl)).

The polarisation curves were taken at 900 rpm rotation rate while scanning the electrode potential at 20 mV/s rate.

Figure 3:
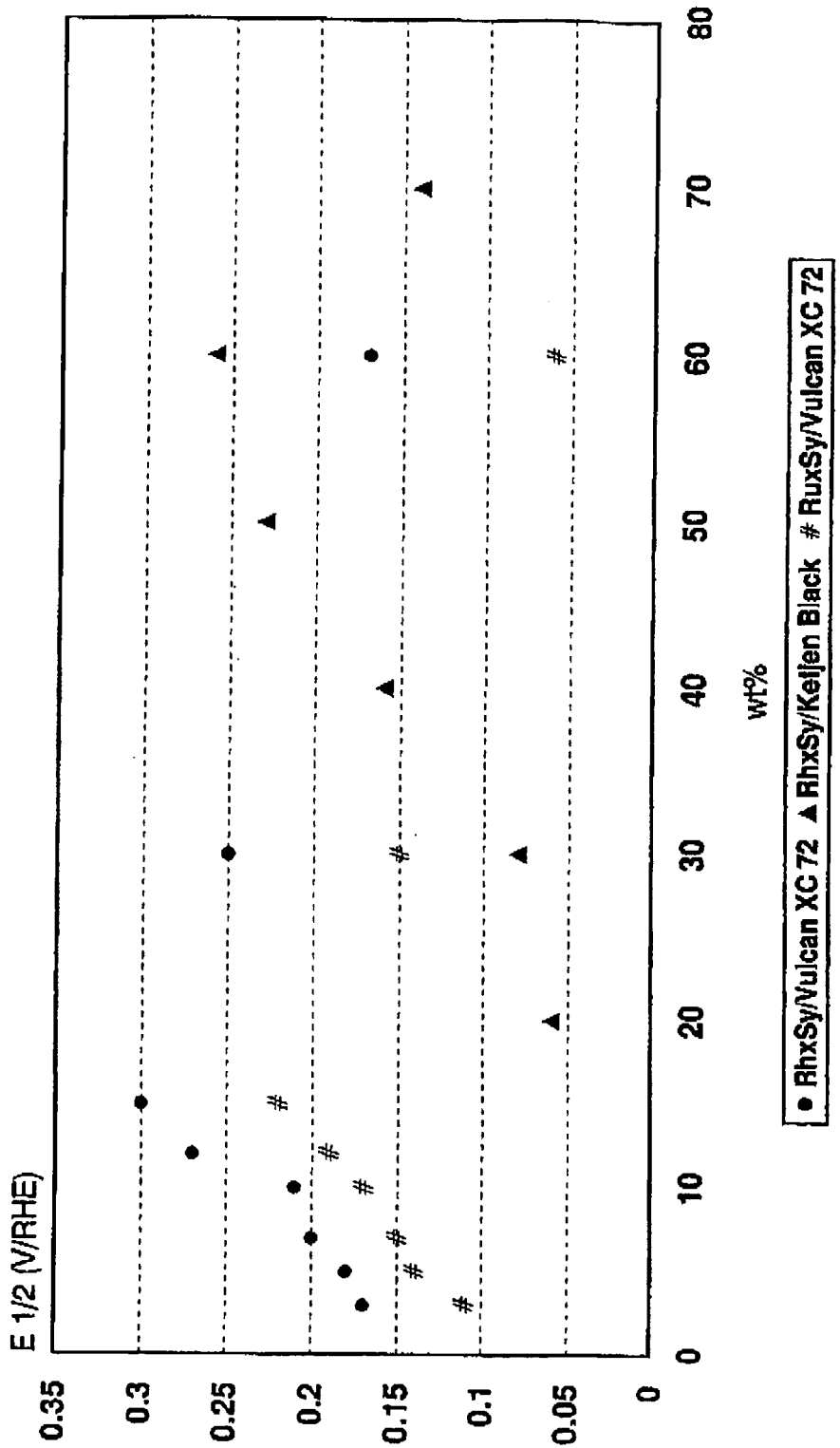
FIG. 3 shows the mass specific electrochemical activity towards ORR of rhodium sulphide catalysts supported on Vulcan XC-72 carbon at different specific loadings

Further RDE data collected as described above for three sets of differently loaded noble metal sulphide catalysts are plotted in FIG. 3: the three series respectively refer to a first rhodium sulphide catalyst supported on Vulcan XC 72 active carbon, to a second rhodium sulphide catalyst supported on a Ketjen Black carbon of 900 m²/g active area, and to a ruthenium sulphide catalyst, again on Vulcan XC 72. As it can be noticed, very sharp volcano plots are obtained indicating that, as concerns Vulcan-supported catalysts, compositions around 15% $M_xS_y$ on carbon (M standing generically for noble metal) are surprisingly active in terms of RDE-determined half-wave potential, and in general that the whole range of 12 to 18% by weight $M_xS_y$ shows an enhanced catalytic activity; outside of this range, the catalyst loading is most likely either too low to support ORR efficaciously, or too high to preserve the monodispersed particle distribution. A similar trend is observed for the Ketjen-supported $Rh_xS_y$ catalyst, however the peak activity is observed at about 60% by weight loading on account of the higher superficial area of this carbon.

Figure 4:
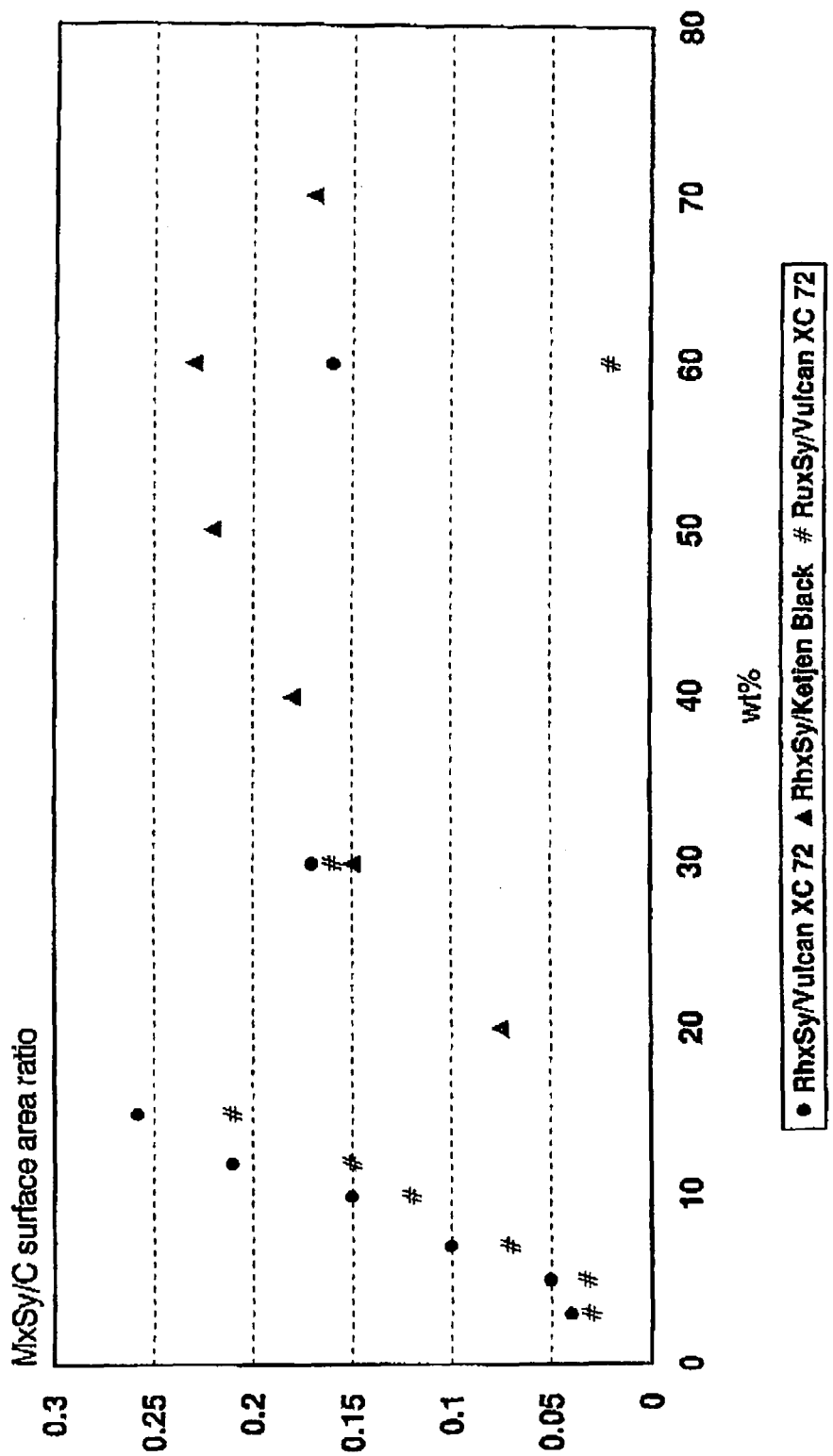
FIG. 4 shows the superficial area ratio of noble metal sulphide particles to active carbon particles for carbon supported sulphide catalysts at different specific loadings

This behaviour is better understood observing the plot of FIG. 4, wherein the ratio of noble metal sulphide superficial area to carbon superficial area is reported as a function of the specific loading. It can be noticed that the trend of this surface area ratio as a function of the sulphide loading on the carbon support looks very similar to the trend of RDE-determined half wave potential reported in FIG. 2. From a qualitative standpoint, it can be noticed that the more active catalysts are obtained when the noble metal sulphide to carbon support superficial area ratio is maximised; moreover, it can be seen that the maximum values of such ratio are higher than 0.20 for all the considered catalyst, slightly exceeding the value of 0.25 in the case of the most active catalyst. Such values are generally typical for all carbon supported-noble metal sulphide catalysts.

Figure 5:
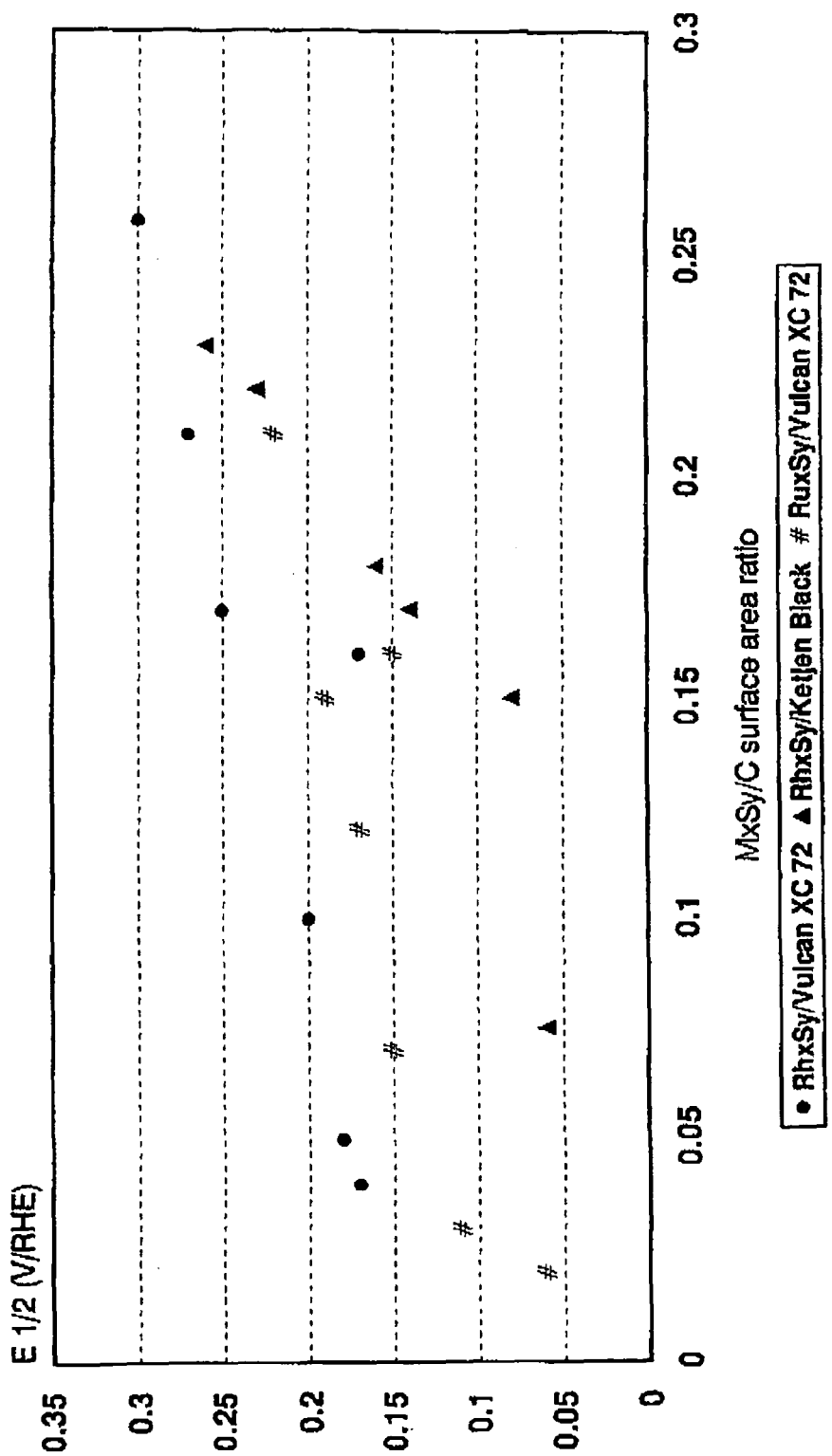
FIG. 5 shows the mass specific electrochemical activity towards ORR of different carbon supported-noble metal catalysts as a function of the superficial area ratio of noble metal sulphide particles to active carbon particles

FIG. 5 shows a direct correlation between sulphide catalyst to carbon support surface area ratio and RDE-determined catalytic activity: there is a definite trend of increased activity at higher surface area ratios, with the catalysts having a surface area ratio higher than 0.20 being much preferred in terms of catalytic activity.

The formulation of very active catalysts with a reduced specific loading of noble metals has an important consequence in the total noble metal loading required for gas-diffusion electrodes incorporating the same: gas-diffusion electrodes for industrial applications are in fact obtained by coating a thin catalyst layer on a suitable conductive web, and the specific loading of noble metal on carbon is directly proportional to the minimum amount of metal required for the formation of a continuous active layer. In the prior art, 30% $Rh_xS_y$ on Vulcan XC-72 has been disclosed as the preferred catalyst for ORR in hydrochloric acid depolarised electrolysis, and this has been the only noble metal sulphide electrocatalyst employed so far in commercial applications; the teaching of the present invention allows to select an optimum specific loading thereby decreasing the total amount of noble metal by simply controlling the surface area ratio of noble metal sulphide particles to active carbon particles, thereby decreasing the catalyst cost while increasing the electrochemical performances, as shown by the following example.

EXAMPLE

Two rhodium sulphide catalysts on Vulcan XC-72 of 250 m²/g active area were prepared at two different specific noble metal loadings, respectively 30 and 15% by weight, by means of the following procedures:

30% catalyst 7.5 g of $RhCl_3.H_2O$ were dissolved in 0.5 liters of deionised water, and the solution was refluxed; 7 g of Vulcan XC-72 carbon black from Cabot Corporation were added to the solution, and the mix was sonicated for 1 hour at 40° C.; 8.6 g of $(NH_4)_2S_2O_3$ were diluted in 60 ml of deionised water, after which a pH of 1.64 was determined.

The rhodium/Vulcan solution was heated to 70° C. while stirring and monitoring the pH. Once reached 70° C., the thiosulphate solution was added in four equivalent aliquots (7.5 ml each), one every 2 minutes. Between each addition, constancy of pH, temperature and colour of the solution were checked.

After the last aliquot of thiosulphate solution was added, the resulting solution was heated to 100° C. and temperature was held for 1 hour. The reaction was monitored by checking the colour changes: the initial deep pink/orange colour, which progressively changed to brown as the reaction progressed, finally turned to colourless upon completion of the reaction, thus indicating a total absorption of the products on the carbon. Spot tests were also carried out in this phase at various times with a lead acetate paper, which confirmed that no free sulphide ion was present in the reaction environment at any time. The precipitate was allowed to settle and then filtered; the filtrate was washed with 1000 ml deionised water to remove any excess reagent, then a filter cake was collected and air dried at 110° C. overnight. The dried product was finally subjected to heat treatment under flowing argon for 1 hour at 650° C., resulting in a weight loss of 22.15%.

15% catalyst 3.75 g of $RhCl_3.H_2O$ were dissolved in 0.3 liters of deionised water, and the solution was refluxed; 8.5 g of Vulcan XC-72 carbon black from Cabot Corporation were added to the solution, and the mix was sonicated for 1 hour at 40° C.; 4.3 g of $(NH_4)_2S_2O_3$ were diluted in 30 ml of deionised water, after which a pH of 1.84 was determined.

The rhodium/Vulcan solution was heated to 70° C. while stirring and monitoring the pH. Once reached 70° C., the thiosulphate solution was added in four equivalent aliquots (15 ml each), one every 2 minutes. Between each addition, constancy of pH, temperature and colour of the solution were checked.

After the last aliquot of thiosulphate solution was added, the resulting solution was heated to 100° C. and temperature was held for 1 hour. The reaction was monitored by checking the colour changes: the initial deep pink/orange colour, which progressively changed to brown as the reaction progressed, finally turned to colourless upon completion of the reaction, thus indicating a total absorption of the products on the carbon. Spot tests were also carried out in this phase at various times with a lead acetate paper, which confirmed that no free sulphide ion was present in the reaction environment at any time. The precipitate was allowed to settle and then filtered; the filtrate was washed with 1000 ml deionised water to remove any excess reagent, then a filter cake was collected and air dried at 110° C. overnight. The dried product was finally subjected to heat treatment under flowing argon for 2 hour at 650° C., resulting in a weight loss of 17.5%.

The performances in hydrochloric acid electrolysis of the above catalysts incorporated in a gas-diffusion structure on a conductive web as known in the art were also checked. Catalyst/binder layers with a noble metal loading respectively of 10 and 4.5 g/m² were obtained for the 30% and the 15% $Rh_xS_y$/C samples on an ELAT® carbon cloth-based gas diffuser produced by De Nora North America/USA; PTFE from an aqueous suspension was used as the binder. The gas diffusion-electrodes thus obtained were sintered at 340° C. under forced ventilation, and then used as an oxygen-reducing cathodes in a hydrochloric acid electrolysis lab cell. No noticeable decrease in cell performance was observed in going from a GDE having a 10.0 g/m² (30 wt. % $Rh_xS_y$)

loading to one having a 5.0 g/m² loading (15 wt. % $Rh_xS_y$). The higher loading of the commercially available $Rh_xS_y$ GDE does not appear to further enhance the overall cell performance; on the contrary, the electrode activity attains a plateau. This result is of high practical significance, since it shows that the low loaded electrode-catalyst (15 wt. % $Rh_xS_y$) can be cost competitive with respect to the traditional GDE (30 wt. % $Rh_xS_y$). The increase in catalytic activity of the 15 wt. % $Rh_xS_y/C$ is further visible below the 4 kA/m² (kinetic region); at this current density a cell voltage of 1.1±0.1 V for the 30 wt. % sample and of 1.1±0.1 V for the 15 wt. % were recorded after an initial conditioning period during a two week operation.

The previous description shall not be intended as limiting the invention, which may be practised according to different embodiments without departing from the scopes thereof, and whose extent is solely defined by the appended claims.

Throughout the description and claims of the present application, the term "comprise" and variations thereof such as "comprising" and "comprises" are not intended to exclude the presence of other elements or additives.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

What is claimed is:

1. A catalyst for electrochemical reduction comprising a noble metal sulfide supported on active carbon particle, wherein the noble metal sulfide particles are monodispersed on the active carbon particles and the surface ratio of noble metal sulfide particles to active carbon particles is at least 0.20.

2. The catalyst of claim 1 wherein said noble metal sulfide is a rhodium sulfide.

3. The catalyst of claim 2 wherein the specific loading of said rhodium sulfide is 12 to 18% by weight on an active carbon of 200 to 300 m²/g surface area.

4. The catalyst of claim 3 wherein said active carbon is Vulcan XC-72.

5. The catalyst of claim 3 wherein said surface area ratio of noble metal sulfide to active carbon is at least 0.25.

6. A gas-diffusion electrode comprising the catalyst of claim 1 on a conductive web.

7. The gas-diffusion electrode of claim 6 wherein the loading of said noble metal sulfide per unit area is comprised between 3 and 5 g/m².

8. A method for the manufacturing of a catalyst of claim 1 comprising the steps of:
preparing a solution of a precursor compound of said noble metal;
dispersing of active carbon particles into said solution of precursor compound;
preparing a solution of a thionic compound selected from the group consisting of thiosulfates and thionates; and
reacting step-wise said thionic compound solution with carbon containing-precursor solution in a predetermined proportion.

9. The method of claim 8 further comprising the step of subjecting the filtered and dried product to a thermal treatment at a temperature of 150 to 700° C.

10. The method of claim 8 wherein said precursor compound is a chloride.

11. A process of electrolysis of aqueous solutions of hydrochloric acid wherein the improvement comprises using the gas-diffusion electrode of claim 6 as the cathode.

* * * * *